United States Patent
Li et al.

(10) Patent No.: US 10,306,194 B2
(45) Date of Patent: May 28, 2019

(54) APPARATUS, METHOD AND SYSTEM FOR LOCATION BASED TOUCH (71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Kun Li, Beijing (CN); Tao Ma, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 231 days.

(21) Appl. No.: 15/206,879

(22) Filed: Jul. 11, 2016

(65) Prior Publication Data
US 2017/0242547 A1 Aug. 24, 2017

(30) Foreign Application Priority Data
Feb. 22, 2016 (CN) .......................... 2016 1 0096397

(51) Int. Cl.
*H04N 9/31* (2006.01)
*G06F 3/041* (2006.01)
(Continued)

(52) U.S. Cl.
CPC ....... *H04N 9/3179* (2013.01); *G06F 3/03542* (2013.01); *G06F 3/042* (2013.01); *G06F 3/0418* (2013.01); *H04N 9/3194* (2013.01)

(58) Field of Classification Search
CPC ................ H04N 9/3179; H04N 9/3194; G06F 3/03542; G06F 3/0418; G06F 3/042
(Continued)

(56) References Cited

U.S. PATENT DOCUMENTS

| 2009/0027335 | A1 | 1/2009 | Ye | |
|---|---|---|---|---|
| 2009/0073116 | A1* | 3/2009 | Horiuchi | G02F 1/13338 345/157 |
| 2014/0253884 | A1* | 9/2014 | Kuki | G03B 21/142 353/85 |

FOREIGN PATENT DOCUMENTS

| CN | 101238428 A | 8/2008 |
|---|---|---|
| CN | 101387932 A | 3/2009 |

(Continued)

OTHER PUBLICATIONS

Office Action from Chinese Application No. 201610096397.8 dated Jan. 30, 2018 (15 pages).

*Primary Examiner* — Amare Mengistu
*Assistant Examiner* — Gloryvid Figueroa-Gibson
(74) *Attorney, Agent, or Firm* — Harness, Dickey & Pierce, P.L.C.

(57) ABSTRACT

The embodiments of the disclosure provide apparatus, method and system for location based touch, which can implement location based touch on the image of the projection display apparatus without the requirement of operation of the computing device by the user. A projection display apparatus comprises a projection screen and a plurality of optical sensors with two-dimension disperse layout in the back of the projection screen. The projection display apparatus further comprises an acquiring element configured to receive first light through first optical sensor of the plurality of optical sensors, wherein the first optical sensor is one or more of the plurality of optical sensors; a determining element configured to determine first coordinate information of the first optical sensor on the projection screen if the light intensity of the first light is within first light intensity range; and a sending element configured to send the first coordinate information to a computing device.

8 Claims, 5 Drawing Sheets (51) Int. Cl.
*G06F 3/042* (2006.01)
*G06F 3/0354* (2013.01)

(58) Field of Classification Search
USPC .......................................................... 345/175
See application file for complete search history.

(56) References Cited

FOREIGN PATENT DOCUMENTS

| | | |
|---|---|---|
| CN | 201877020 U | 6/2011 |
| CN | 102279656 A | 12/2011 |
| CN | 103632531 A | 3/2014 |
| CN | 103838437 | 6/2014 |
| CN | 104001273 A | 8/2014 |

\* cited by examiner

APPARATUS, METHOD AND SYSTEM FOR LOCATION BASED TOUCH

CROSS-REFERENCE TO RELATED APPLICATION

This application claims the benefit and priority of Chinese Patent Application No. 201610096397.8 filed Feb. 22, 2016. The entire disclosure of the above application is incorporated herein by reference.

FIELD

The present disclosure relates to apparatus, method and system for location based touch.

BACKGROUND

This section provides background information to the present disclosure which is not necessarily prior art.

Projector, which is referred to as projection machine, is a device that can project an image or video to a projection display apparatus (such as a projection screen). Generally, the projector can be connected with a computing device to project an image on the screen of the computing device to the projection screen to facilitate demonstration of the image on the screen of the computing device to users.

However, the projector can only demonstrate the image on the screen of the computing device, it may always require the user to directly operate corresponding buttons on the screen of the computing device when it is required to change the projected image on the projection screen (for example, to switch the PPT presentations) or trigger function keys within the image (for example, click the shutdown key in the image), which may cause the operations for controlling the projected image to be more cumbersome and that the user cannot directly make man-machine interaction with the projection display apparatus.

SUMMARY

This section provides a general summary of the disclosure, and is not a comprehensive disclosure of its full scope or all of its features.

The embodiments described herein provide apparatus, method and system for location based touch, which can implement location based touch on the image of the projection display apparatus without the requirement of operation of the computing device by the user, thereby realizing the man-machine interaction between the user and the projection display apparatus.

In an aspect, a projection display apparatus is provided. The projection display apparatus comprises a projection screen and a plurality of optical sensors with two-dimension disperse layout in the back of the projection screen, the projection display apparatus further comprising an acquiring element configured to receive first light through first optical sensor of the plurality of optical sensors, wherein the first optical sensor is one or more of the plurality of optical sensors; a determining element configured to determine first coordinate information of the first optical sensor on the projection screen if the light intensity of the first light is within first light intensity range; and a sending element configured to send the first coordinate information to a computing device.

In an embodiment, the acquiring element is further configured to acquire the light intensity information sensed by respective optical sensors after second light output by a projector reaching the projection screen to form a projection image; the determining element is further configured to determine the coordinate information of the optical sensors corresponding to the light intensity information within second light intensity range on the projection screen, and determine regional information of the projection image based on the coordinate information; and the sending element is further configured to send the regional information to the computing device.

In an embodiment, the plurality of optical sensors are N*M optical sensors with array configuration, both N and M are integers greater than 1, and the determining element is configured to determine the first coordinate information of the first light on the projection screen as (X, Y) if the first optical sensor is the Y-th optical sensor in X-th column of the N*M optical sensors.

In an embodiment, the sending element is configured to send the first coordinate information to the computing device through wireline or wireless transmission.

In an embodiment, the projection display apparatus further comprises a receiving element configured to receive a switch directive used for indicating enabling or disabling of the touch function.

In another aspect, a computing device is provided. The computing device comprises a receiving element configured to receive first coordinate information, wherein the first coordinate information indicates the location of first optical sensor on a projection screen, and the first optical sensor is one or more of a plurality of optical sensors; a determining element configured to determine second coordinate information corresponding to the first coordinate information on a screen of the computing device according to the first coordinate information and coordinate mapping relationship between a projection image and the screen of the computing device; and a performing element configured to perform a touch operation corresponding to the second coordinate information within the screen of the computing device according to the second coordinate information.

In an embodiment, the computing device further comprises a building element, wherein the receiving element is further configured to receive regional information indicating coordinate information of the projection image on the projection screen; and the building element is configured to build the coordinate mapping relationship between the projection screen and the screen of the computing device based on the regional information.

In an embodiment, N*M optical sensors with array configuration are arranged in the back of the projection screen, both N and M are integers greater than 1, the determining element is further configured to determine the size of the projection image based on the regional information, and locations of J*K optical sensors corresponding to the projection image, wherein the J*K optical sensors are located within the N*M optical sensors, and determine correspondence relationship between each of the J*K optical sensors and the screen of the computing device based on the proportional relation between the size of the projection image and the size of the screen of the computing device; and the building element is configured to build the coordinate mapping relationship between the projection image and the screen of the computing device based on the correspondence relationship between each optical sensor and the screen of the computing device.

In an embodiment, the receiving element is further configured to receive a switch directive used for indicating enabling or disabling of the touch function.

In another aspect, a laser pointer is provided. The laser pointer comprises a housing; a laser transmitter, a laser generation module connected with the laser transmitter, a control module connected with the laser generation module and a power source connected with the control module being deposited inside the housing, and the laser generation module capable of generating first light which is sent by the laser transmitter, wherein a wireless communication module and a touch switch connected with the control module are also arranged inside the housing; the wireless communication module is triggered to send a switch directive when the touch switch is closed, wherein the switch directive indicates enabling or disabling of the touch function.

In another aspect, a projection system is provided. The projection system comprises above mentioned computing device, a projector, above mentioned projection display apparatus and above mentioned laser pointer.

In another aspect, a method is provided. The method comprises, at a projection display apparatus, receiving first light by first optical sensor in the projection display apparatus, wherein the first optical sensor is one or more of a plurality of optical sensors; determining first coordinate information of the first optical sensor on a projection screen if the light intensity of the first light is within first light intensity range; and sending the first coordinate information to a computing device.

In an embodiment, the method further comprises acquiring the light intensity information sensed by respective optical sensors after second light output by a projector reaching the projection screen to form a projection image; determining the coordinate information of the optical sensors corresponding to the light intensity within second light intensity range on the projection screen; determining regional information of the projection image based on the coordinate information; and sending the regional information to the computing device.

In an embodiment, the plurality of optical sensors are N*M optical sensors with array configuration, both N and M are integers greater than 1, wherein determination of first coordinate information of the first optical sensor on the projection screen comprises determining the first coordinate information of the first light on the projection screen as (X, Y) if the first optical sensor is the Y-th optical sensor in X-th column of the N*M optical sensors.

In an embodiment, sending the first coordinate information to the computing device comprises sending the first coordinate information to the computing device through wireline or wireless transmission.

In an embodiment, the method further comprises receiving a switch directive used for indicating enabling or disabling of the touch function.

In another aspect, a method is provided. The method comprises, at a computing device, receiving first coordinate information, wherein the first coordinate information indicates the location of first optical sensor on a projection screen, and the first optical sensor is one or more of a plurality of optical sensors; determining second coordinate information corresponding to the first coordinate information on a screen of the computing device according to the first coordinate information and coordinate mapping relationship between a projection image and the screen of the computing device; and performing a touch operation corresponding to the second coordinate information within the screen of the computing device according to the second coordinate information.

In an embodiment, the method further comprises receiving regional information indicating coordinate information of the projection image on the projection screen; and building the coordinate mapping relationship between the projection screen and the screen of the computing device according to the regional information.

In an embodiment, N*M optical sensors with array configuration are arranged in the back of the projection screen, both N and M are integers greater than 1, wherein building the coordinate mapping relationship between the projection screen and the screen of the computing device according to the regional information comprises determining the size of the projection image based on the regional information, and locations of J*K optical sensors corresponding to the projection image, wherein the J*K optical sensors are located within the N*M optical sensors; determining correspondence relationship between each of the J*K optical sensors and the screen of the computing device based on the proportional relation between the size of the projection image and the size of the screen of the computing device, and building the coordinate mapping relationship between the projection image and the screen of the computing device based on the correspondence relationship between each optical sensor and the screen of the computing device.

In an embodiment, the method further comprises receiving a switch directive used for indicating enabling or disabling of the touch function.

The embodiments described herein provide apparatus, method and system for location based touch. The method may be applied in a projection system, which may comprise the computing device, a projector, and the projection display apparatus comprising a projection screen and a plurality of optical sensors with two-dimension layout in the back of the projection screen. In the process of implementation of location based touch, first optical sensor of the projection display apparatus receives first light, wherein the first optical sensor is one or more of a plurality of optical sensors; the projection display apparatus determines first coordinate information of the first optical sensor on a projection screen if the light intensity of the first light is within first light intensity range; and then the projection display apparatus sends the first coordinate information to the computing device to cause the computing device to determine second coordinate information corresponding to the first coordinate information according to the first coordinate information and pre-stored coordinate mapping relationship between a projection image and the screen of the computing device, and perform a touch operation corresponding to the second coordinate information within the screen of the computing device. It can be seen that the computing device is caused to determine the second coordinate information corresponding to the first coordinate information within the screen of the computing device by locating the first coordinate information of the first light within the projection screen, thereby realizing the touch operation corresponding to the second coordinate information, i.e., the location based touch of the projection display apparatus can be realized without the requirement of the operation on the computing device by the user, thereby facilitating the man-machine interaction between the user and the projection display apparatus.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

It should be understood that the computing device 02 as illustrated and hereinafter described is merely illustrative of an apparatus that could benefit from embodiments of the disclosure and, therefore, should not be taken to limit the scope of the disclosure. While the computing device 02 is illustrated and will be hereinafter described for purposes of example, other types of apparatuses may readily employ embodiments of the disclosure. The computing device 02 may be a portable digital assistant (PDAs), a mobile computer, a desktop computer, a smart television, a gaming apparatus, a laptop computer, a media player, a camera, a video recorder, a mobile phone, a global positioning system (GPS) apparatus, a smart phone, a tablet, a server, a thin client, a cloud computer, a virtual server, a set-top box, a computing device, a distributed system, and/or any other suitable types of electronic systems. The computing device 02 may run with any kind of operating system including, but not limited to, Windows, Linux, UNIX, Android, iOS and their variants. Moreover, the computing device of at least one example embodiment need not to be the entire apparatus, but may be a component or group of components of the apparatus in other example embodiments.

The projector 03 may be any suitable existing or future projection apparatus capable of outputting a projection image, and the disclosure has not limit on it. For example, the projector may be fixed, removable, portable, commercial, home use, handheld projection apparatus or the like.

Figure 2:
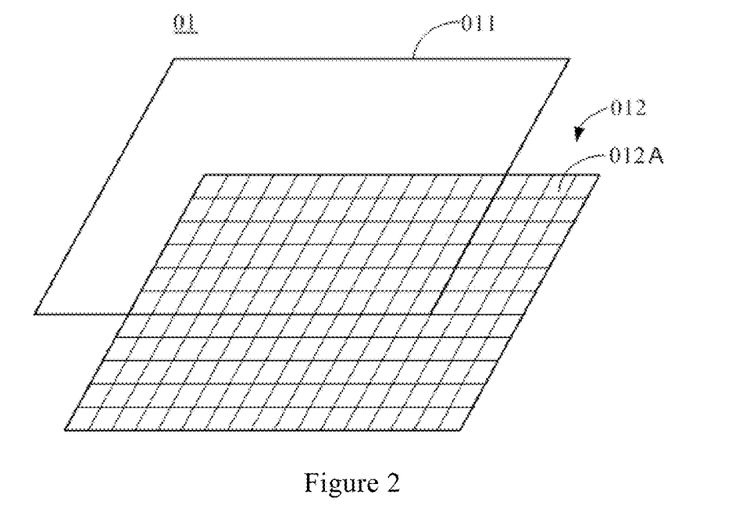
FIG. 2 schematically shows the structure of a projection display apparatus according to an embodiment of the disclosure.

In an embodiment, as shown in FIG. 2, the projection display apparatus 01 may comprise a projection screen 011 and a plurality of optical sensors 012 with two-dimension disperse layout in the back of the projection screen 011, for example, N*M optical sensors 012 with array configuration, wherein both N and M are integers greater than 1.

Specifically, the optical sensors 012 can convert the received optical signal to the electrical signal, such as photoelectric tubes, photomultiplier tubes, photosensitive resistance, light activated triodes, infrared sensors, ultraviolet sensors, optical fiber type photoelectric sensor or the like, and the embodiments of the disclosure have no limit on it.

As an example, the optical sensors 012 are sensitive to light within a certain intensity (for example, first light intensity range, second light intensity range or the like), and when the light intensity information of the first light (for example, from a laser pointer) received by a first optical sensor 012A in the N*M optical sensors 012 with array configuration in the projection display apparatus 01 is within the first light intensity range, the projection display apparatus 01 may determine first coordinate information of the first optical sensor 012A in on the projection screen 011 according to the location of the first optical sensor 012A in in the N*M optical sensors 012, and then the projection display apparatus 01 can send the first coordinate information to the computing device 02. The computing device 02 may determine second coordinate information (i.e., the location corresponding to the first coordinate information on the projection screen 011 within the screen of the computing device 02) corresponding to the first coordinate information according to the first coordinate information and pre-stored coordinate mapping relationship between the projection image and the screen of the computing device, and perform a touch operation corresponding to the second coordinate information within the screen of the computing device 02, for example shutdown, opening microphone or the like. The projection display apparatus 01 can display the touch operation on the projection screen 011 simultaneously and present the touch operation to the user through the projection screen 011.

It is noted that the above light intensity information is used to represent a light level, for example, the light intensity information may be a light intensity value, or a current value or the like, and the embodiments of the present disclosure have no limit on it. In addition, the light output by different devices may have same or different light intensities. In embodiments of the present disclosure, the light intensity range of first light (for example from a laser pointer) may be defined as first light intensity range, and the light intensity range of second light (for example from a projector) may be defined as second light intensity range. The first light intensity range and the second light intensity range are non-overlapping in embodiments of the disclosure.

It can be seen that the user can directly send a touch directive to the projection display apparatus 01 to implement the location based touch on the projection display apparatus without the requirement of operations of the computing device, such that the user can make a man-machine interaction with the projection display apparatus.

Figure 3:
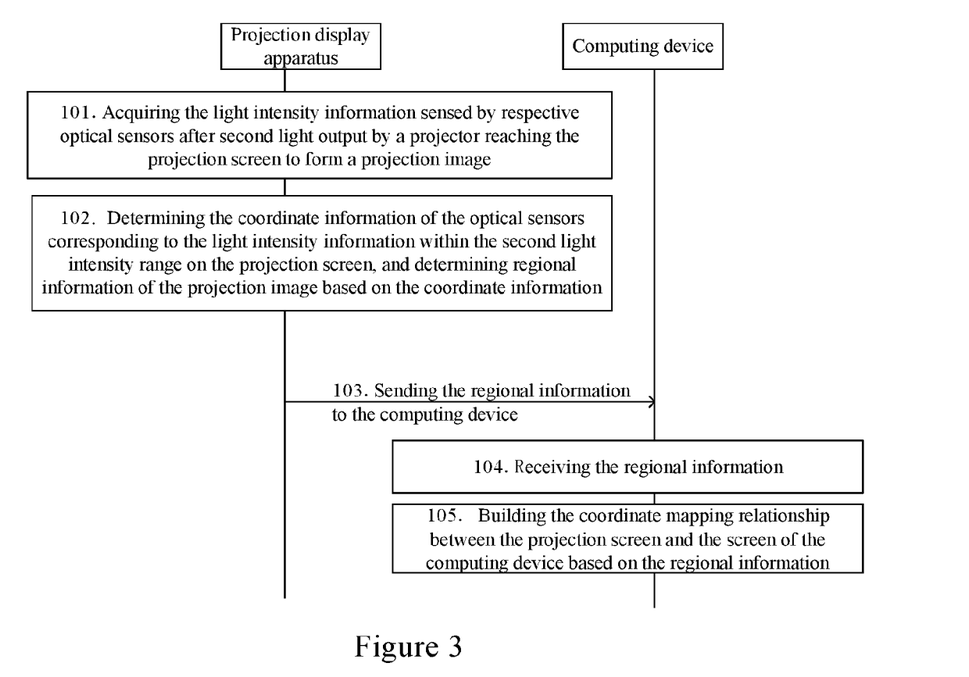
FIG. 3 schematically shows a flowchart of method of location based touch according to an embodiment of the disclosure.

In the following, taking the plurality of optical sensors comprising N*M optical sensors with array configuration as an example, a method for location based touch is described in detail in connection with embodiments of the disclosure. As shown in FIG. 3, the method comprises:

At 101, the projection display apparatus acquires the light intensity information sensed by respective optical sensors after second light output by a projector reaching the projection screen to form a projection image.

At 102, the projection display apparatus determines the coordinate information of the optical sensors corresponding to the light intensity information within the second light intensity range on the projection screen, and determines regional information of the projection image based on the coordinate information.

At 103, the projection display apparatus sends the regional information to the computing device.

At 104, the computing device receives the regional information sent by the projection display apparatus.

At 105, the computing device builds coordinate mapping relationship between the projection image and the screen of the computing device based on the regional information.

Figure 1:
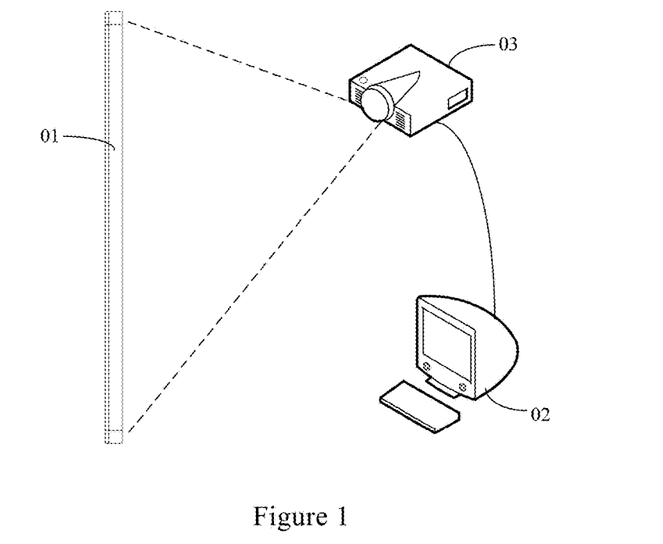
FIG. 1 schematically shows the structure of a projection system according to an embodiment of the disclosure.

In step 101, the projector 03 may output second light on a certain area (i.e., a projection area) of the projection screen 011 of the projection display apparatus 01 when an image displayed by the computing device 02 is projected to the projection display apparatus 01 as shown in FIG. 1. The projection display apparatus can detect the light intensity information of the output second light through N*M optical sensors since the luminance of the projection area is apparently higher than the luminance of the non-projection area.

In step 102, if the light intensity information of the second light is within the second light intensity range, the projection display apparatus may acquire the coordinate information of the optical sensors corresponding to the light intensity information to determine regional information of the projection image.

In an embodiment, the regional information may indicate the location of an area occupied by the projection image on the projection screen. By way of example, the regional information may be coordinates of four vertexes of the projection image, or coordinate information of respective optical sensors within the area occupied by the projection image. The embodiments of the present disclosure have no limit on this.

Figure 4:
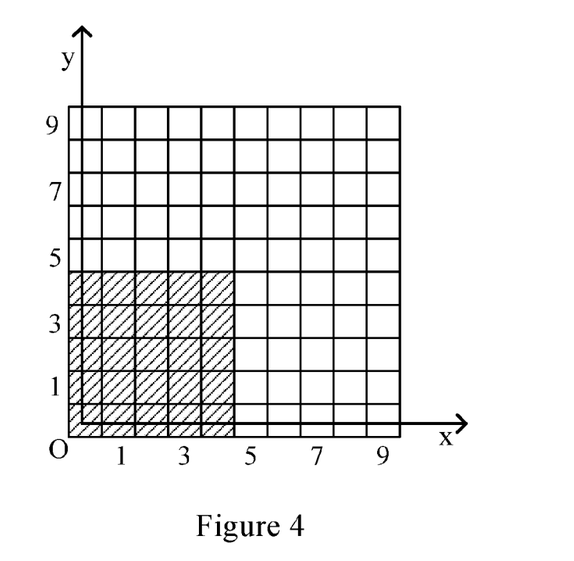
FIG. 4 schematically shows the structure of a projection display apparatus according to an embodiment of the disclosure.

For example, as shown in FIG. 4, the projection display apparatus comprises 10*10 optical sensors, and first rectangular coordinate system may be built by taking the center of the optical sensor in the bottom-left corner as the origin of coordinates. In this embodiment, 5*5 optical sensors in the bottom-left corner may detect the second light, and the regional information of the projection image formed by the second light on the projection screen may comprise the coordinate information including X-axis coordinates 0-4 and Y-axis coordinates 0-4 since respective optical sensors are corresponding to respective locations on the projection screen.

In step 103, the projection display apparatus may send the regional information to the computing device.

For example, the regional information may be sent to the computing device through wireline or wireless transmission.

In addition, the above second light intensity range and the above first light intensity range are not overlapped.

In step 104, the computing device receives the regional information sent by the projection display apparatus in step 103. Similarly, the regional information may indicate the locations of the area occupied by the projection image on the projection screen.

In step 105, the computing device may build the coordinate mapping relationship between the projection screen and the screen of the computing device.

Specifically, the computing device firstly determines the size of the projection image based on the regional information, and the locations of J*K optical sensors corresponding to the projection image, wherein the J*K optical sensors are located within the N*M optical sensors. Still using the example in step 101, the regional information of the projection image formed by the second light on the projection screen may comprise the area surrounded by X-axis coordinates 0-4 and Y-axis coordinates 0-4, and by taking the area of an optical sensor being 5 square centimeters as an example, the area equals to the size of the projection image, i.e., 5*5*5=125 square centimeters, and the coordinates of 5*5 optical sensors corresponding to the projection image are (0, 0)-(4, 4).

The computing device may then determine correspondence relationship between each of the J*K optical sensors and the screen of the computing device based on the proportional relation between the size of the projection image and the size of the screen of the computing device. By taking the size of the screen of the computing device being 50 square centimeters as an example, the proportional relation between the size of the projection image and the size of the screen of the computing device is 2.5 on 1, then the area corresponding to one optical sensor on the screen of the computing device is 2 square centimeters.

Finally, the computing device may build the coordinate mapping relationship between the projection image and the screen of the computing device based on the correspondence relationship between each optical sensor and the screen of the computing device. For example, second rectangular coordinate system may be built by taking the bottom-left corner of the screen of the computing device as the origin of coordinates. If a unit area in the second rectangular coordinate system is 2 square centimeters, then the location of each of the J*K optical sensors in the first rectangular coordinate system has a one-to-one correspondence relationship with each coordinate in the second rectangular coordinate system.

The computing device therefore can built the coordinate mapping relationship between the projection image and the screen of the computing device based on the regional information sent by the projection display device, such that the computing device can locate the location of the touch operation performed by the user on the projection display apparatus based on the coordinate mapping relationship.

In addition, it can be seen from the above steps 101-104 that the precision of the location based touch realized by the projection display apparatus may depend on the density of the optical sensors, therefore the precision of the location based touch realized by the projection display apparatus may be increased by increasing the density of the optical sensors.

Figure 5:
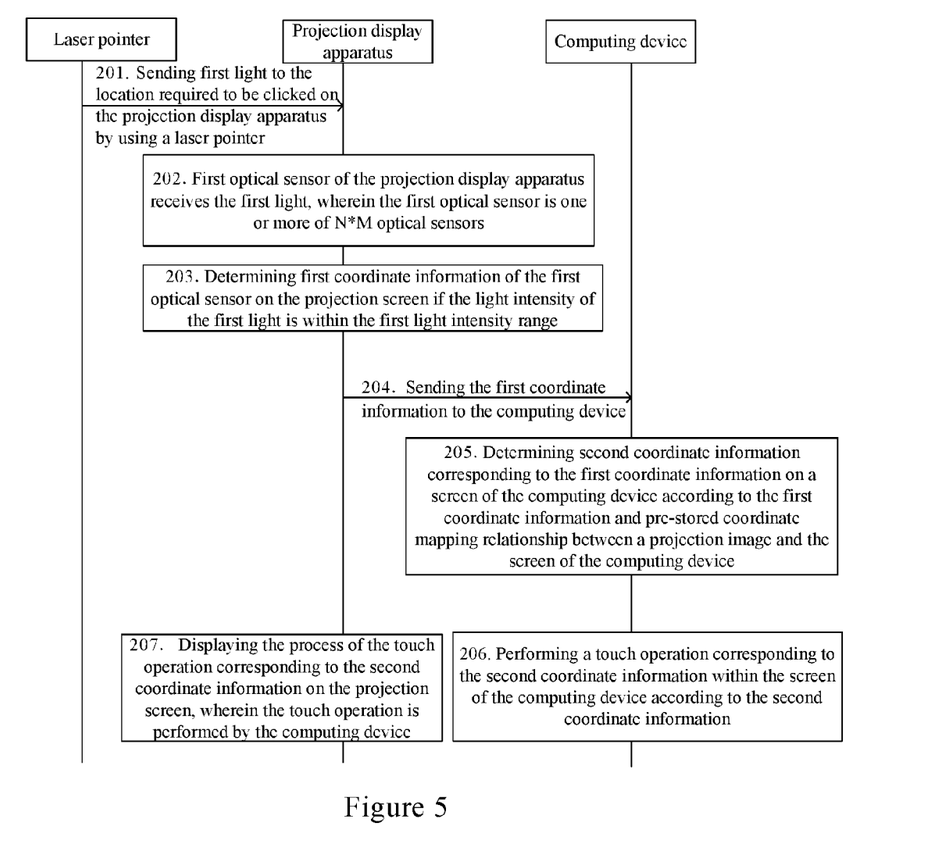
FIG. 5 schematically shows a flowchart of method of location based touch according to an embodiment of the present disclosure.

Based on the above steps 101-104, after building the coordinate mapping relationship between the projection image and the screen of the computing device, the embodiments described herein provide a method for location based touch. As shown in FIG. 5, the method comprises:

At 201, the first light is sent to the location required to be clicked on the projection display apparatus by using a laser pointer.

At 202, first optical sensor of the projection display apparatus receives the first light, wherein the first optical sensor is one or more of N*M optical sensors.

At 203, the projection display apparatus determines first coordinate information of the first optical sensor on the projection screen if the light intensity of the first light is within the first light intensity range;

At 204, the projection display apparatus sends the first coordinate information to the computing device.

At 205, the computing device determines second coordinate information corresponding to the first coordinate information on a screen of the computing device according to the first coordinate information and pre-stored coordinate mapping relationship between a projection image and the screen of the computing device.

At 206, the computing device performs a touch operation corresponding to the second coordinate information within the screen of the computing device according to the second coordinate information.

At 207, the projection display apparatus displays the process of the touch operation corresponding to the second coordinate information on the projection screen, wherein the touch operation is performed by the computing device.

In step 201, the user can directly send a touch directive to the projection image on the projection display apparatus after building the coordinate mapping relationship between the projection image and the screen of the computing device. For example, the user can send the first light to the location required to be clicked on the projection image by using a laser pointer, wherein the location is corresponding to one or more optical sensors in N*M optical sensors, and the first light can be the touch directive which may trigger to click the location required to be clicked.

Figure 6:
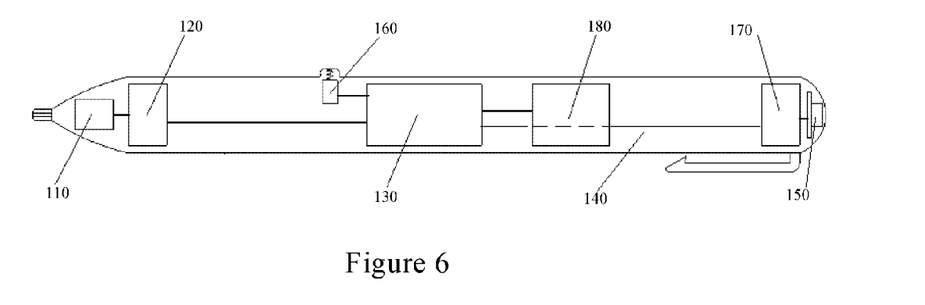
FIG. 6 schematically shows the structure of a laser pointer according to an embodiment of the disclosure.

By way of example, FIG. 6 schematically shows the structure of a laser pointer according to an embodiment of the disclosure. The laser pointer comprises a housing 140, a laser transmitter 110, a laser generation module 120 connected with the laser transmitter 110, a control module 130 connected with the laser generation module 120 and a laser emission switch 160, a wireless communication module 170 and a power source 180 which are connected with the control module 130, wherein the wireless communication module 170 is connected with a touch switch 150. In other embodiments, the laser pointer may comprise a wireline communication module (not shown).

In this embodiment, the control module 130 sends a switch directive to the computing device through the wireless communication module 170 or the wireline communication module when the touch switch 150 is triggered by the user, wherein the switch directive indicates enabling or disabling of the touch function. After the touch function is started, the user triggers the laser emission switch 160, and the control module 130 controls the laser generation module 120 to generate laser (i.e., the first light) which is emitted by the laser transmitter 110. In addition, the control module 130 can send the switch directive to the projection display apparatus through the wireless communication module 170 or the wireline communication module. After the computing device and/or the projection display apparatus receive the switch directive, they may know that the user wishes to perform touch operations, therefore they may start associated functional modules. The advantage realized through the switch directive is that the associated functional modules of the computing device and/or the projection display apparatus may be in off state when the user does not wish to perform the touch operations, thereby saving energy consumption and computing resources. In addition, the misoperation may be avoided. As an example, when the touch function is in off state, the associated touch function may not be triggered even if the first light emitted by the laser pointer reaches an area with the touch function.

When the touch function is in off state, the user still can trigger the laser emission switch 160 to cause the control module 130 to control the laser generation module 120 to generate laser. In this case, the laser pointer according to embodiments is used as a common laser pointer.

As shown in FIG. 2, since N*M optical sensors are relatively arranged in the back of the projection screen for displaying the projection image, therefore the first optical sensor in the projection display apparatus receives the first light in step 202, wherein the first optical sensor is one or more optical sensors in the N*M optical sensors.

In step 203, the projection display apparatus determines first coordinate information of the first optical sensor on the projection screen based on the location of the first optical sensor in the N*M optical sensors, if the light intensity of the first light is within first light intensity range.

Still using FIG. 4 as an example, the projection display apparatus determines the first coordinate information of the first light on the projection screen as (0, 0) based on the location of the first optical sensor in the N*M optical sensors if the optical sensor in the bottom left (i.e., the optical sensor with coordinate (0, 0)) receives the first light and the first light is detected within the first light intensity range.

In step 204, the projection display apparatus sends the first coordinate information to the computing device. For example, the projection display apparatus sends the first coordinate information to the computing device through wireless transmission such as Bluetooth or wireline transmission.

In step 205, after the computing device has received the first coordinate information, it determine second coordinate information corresponding to the first coordinate information on the screen of the computing device according to the first coordinate information and the coordinate mapping relationship between the projection image and the screen of the computing device built in step 104.

Specifically, with reference to step 104, in building the coordinate mapping relationship between the projection image and the screen of the computing device, there is a one-to-one correspondence relationship between the coordinates of J*K optical sensors corresponding to the projection image in the first rectangle coordinate system and coordinates in the second rectangle coordinate system. As an example, when the first coordinate information is (0, 0), the second coordinate information corresponding to (0, 0) in the screen of the computing device is coordinate (0, 0) within the second rectangle coordinate system, i.e., the bottom left in the screen of the computing device, according to the coordinate mapping relationship between the projection image and the screen of the computing device built in step 104.

In step 206, the computing device performs a touch operation corresponding to the second coordinate information within the screen of the computing device according to the second coordinate information.

For example, the second coordinate information is the coordinate (0, 0), i.e., the bottom left of the screen of the computing device, and a start menu is displayed in the bottom left of the screen of the computing device, the computing device may therefore determine that it is required to perform the operation of clicking the start menu and perform corresponding functions.

In step 207, since images displayed within the screen of the computing device can be projected to the projection display apparatus, the projection display apparatus can display the process of the touch operation corresponding to the second coordinate information in the projection screen performed by the computing device.

The embodiments described herein provide a method for location based touch. The method may be applied to a projection system. The projection system may comprise the computing device, a projector and the projection display apparatus, wherein the projection display apparatus comprises a projection screen and a plurality of optical sensors with two-dimension disperse layout in the back of the projection screen. In the process of realization of location based touch, first optical sensor (the first optical sensor is one or more of the plurality of optical sensors above) of the projection display apparatus receives the first light; the projection display apparatus determines first coordinate information of the first optical sensor on the projection screen if the light intensity of the first light is within first light intensity range; and then the projection display apparatus send the first coordinate information to the computing device such that the computing device can determine second coordinate information corresponding to the first coordinate information according to the first coordinate information and the pre-stored coordinate mapping relationship between a projection image and the screen of the computing device, and perform a touch operation corresponding to the second coordinate information within the screen of the computing device. It can be seen that the computing device is caused to determine the second coordinate information corresponding to the first coordinate information within the screen of the computing device by locating the first coordinate information of the first light on the projection screen, thereby realizing the touch operation corresponding to the second coordinate information, i.e., the location based touch of the projection display apparatus can be realized without the requirement of operations on the computing device by the user, thereby facilitating the man-machine interaction between the user and the projection display apparatus.

Figure 7:
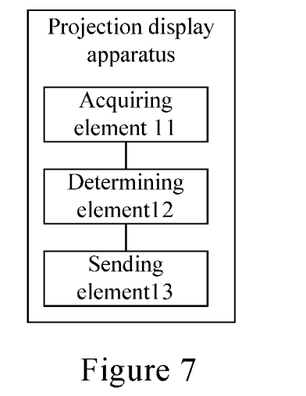
FIG. 7 schematically shows the structure of a projection display apparatus according to an embodiment of the disclosure.

In an embodiment, FIG. 7 schematically shows the structure of a projection display apparatus according to embodiments of the disclosure. The projection display apparatus according to embodiments of the disclosure may perform any suitable method of embodiments of the disclosure as described with reference to FIGS. 1-6. Only parts related to this embodiment are described herein and the detail description of these parts may refer to the embodiments as shown in FIGS. 1-6.

Specifically, the projection display apparatus comprises a projection screen and a plurality of optical sensors with two-dimension disperse layout in the back of the projection screen. As shown in FIG. 7, specifically, the projection display apparatus comprises an acquiring element 11, a determining element 12 and a sending element 13.

In an embodiment, the acquiring element 11 is configured to receive first light through first optical sensor, wherein the first optical sensor is one or more of a plurality of the optical sensors.

In this embodiment, the determining element 12 is configured to determine first coordinate information of the first optical sensor on the projection screen if the light intensity of the first light is within first light intensity range.

In this embodiment, the sending element 12 is configured to send the first coordinate information to a computing device. The first coordinate information can cause the computing device to determine second coordinate information corresponding to the first coordinate information according to the first coordinate information and the pre-stored coordinate mapping relationship between a projection image and the screen of the computing device, and perform a touch operation corresponding to the second coordinate information within the screen of the computing device.

In an embodiment, the acquiring element 11 is further configured to acquire the light intensity information sensed by respective optical sensors after second light output by a projector reaching the projection screen to form a projection image.

In this embodiment, the determining element 12 is further configured to determine the coordinate information of the optical sensors corresponding to the light intensity information within the second light intensity range on the projection screen, and determine regional information of the projection image based on the coordinate information.

In this embodiment, the sending element 13 is further configured to send the regional information to the computing device such that the computing device may build coordinate mapping relationship between a projection image and the screen of the computing device based on the regional information.

In an embodiment, the plurality of sensors are N*M optical sensors with array configuration, both N and M are integers greater than 1, the determining element 12 is further configured to determine the first coordinate information of the first light on the projection screen as (X, Y) if the first optical sensor is the Y-th sensor of column X in the N*M optical sensors.

In an embodiment, the sending element 13 is further configured to send the first coordinate information to the computing device through wireless transmission such as Bluetooth or wireline transmission.

In an embodiment, the projection display apparatus further comprises a receiving element (not shown) configured to receive a switch directive (for example from a laser pointer) used for indicating enabling or disabling of the touch function.

Figure 8:
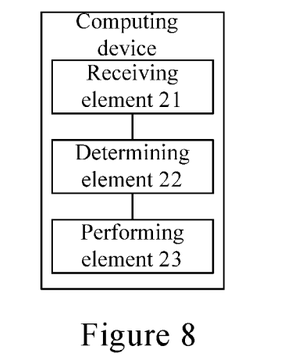
FIG. 8 schematically shows the structure of a computing device according to an embodiment of the disclosure.

FIG. 8 schematically shows the structure of a computing device according to embodiments of the disclosure. The computing device according to embodiments of the disclosure may perform any suitable method of embodiments of the disclosure as described with reference to FIGS. 1-6. Only parts related to this embodiment are described herein and the detail description of these parts may refer to the embodiments as shown in FIGS. 1-6.

Specifically, as shown in FIG. 8, the computing device comprises a receiving element 21, a determining element 22 and a performing element 23.

In an embodiment, the receiving element 21 is configured to receive first coordinate information for example sent by a projection display apparatus, wherein the first coordinate information indicates the location of first optical sensor on a projection screen, and the first optical sensor is one or more of a plurality of optical sensors.

In this embodiment, the determining element 22 is configured to determine second coordinate information corresponding to the first coordinate information on a screen of the computing device according to the first coordinate information and for example pre-stored coordinate mapping relationship between a projection image and the screen of the computing device.

In this embodiment, the performing element 23 is configured to perform a touch operation corresponding to the second coordinate information within the screen of the computing device according to the second coordinate information.

Figure 9:
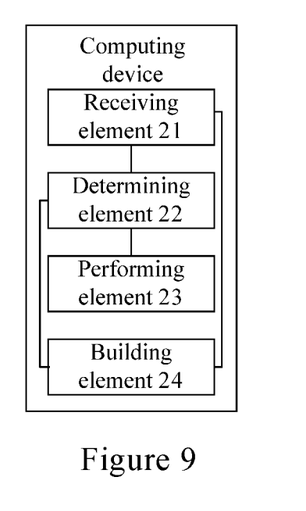
FIG. 9 schematically shows the structure of a computing device according to an embodiment of the disclosure.

In an embodiment, as shown in FIG. 9, the computing device further comprises a building element 24, wherein the receiving element 21 is further configured to receive regional information indicating the coordinate information of the optical sensors corresponding to the light intensity information within second light intensity range on the projection screen, and the building element 24 is configured to build the coordinate mapping relationship between the projection screen and the screen of the computing device based on the regional information.

In an embodiment, the plurality of optical sensors (for example arranged in the back of the projection screen) are N*M optical sensors with array configuration, both N and M are integers greater than 1, and the determining element 22 is further configured to determine the size of the projection image based on the regional information, and locations of J*K optical sensors corresponding to the projection image, wherein the J*K optical sensors are located within the N*M optical sensors, and determine correspondence relationship between each of the J*K optical sensors and the screen of the computing device based on the proportional relation between the size of the projection image and the size of the screen of the computing device; the building element 24 is configured to build the coordinate mapping relationship between the projection image and the screen of the computing device based on the correspondence relationship between each optical sensor and the screen of the computing device.

In an embodiment, the receiving element 21 is further configured to receive a switch directive for example sent by a laser pointer, wherein the switch directive is used for indicating enabling or disabling of the touch function.

Figure 10:
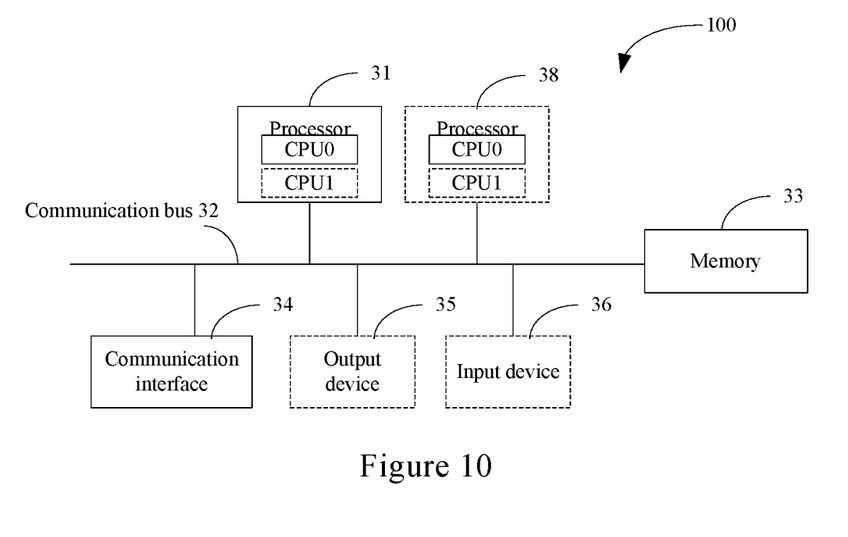
FIG. 10 schematically shows the structure of a computing device according to an embodiment of the disclosure.

By way of example, FIG. 10 schematically shows a computing device 100 according to embodiments of the disclosure. The computing device comprises at least a processor 31, a communication bus, a memory 33 and at least a communication interface 34.

The receiving element 21, determining element 22, performing element 23 and building element 24 above can be implemented by the processor 31 as shown in FIG. 8 invoking instructions in the memory 33.

In an embodiment, the processors 31 may be a central processing unit (CPU), microprocessor, application-specific integrated circuit (ASIC), or one or more integrated circuits for controlling the execution of the program according to embodiments of the disclosure.

The communication bus 32 may comprise a channel for transmitting information among the above components. The communication interface 34 (for example, any suitable transceiver) is used to communicate with other devices or communication networks such as Ethernet, radio access network (RAN), wireless local area Networks (WLAN) or the like.

The memory 33 may be, but not limited to, a read-only memory (ROM) or any other kinds of static memory device capable of storing static information and instructions, a random access memory (RAM) or any other kinds of dynamic memory device capable of storing dynamic information and instructions, an erasable programmable read-only memory (EPROM), a compact disc read-only memory (CD-ROM) or other optical storage device (such as an optical disk, a laser disc, DVD, Blu-ray Disc or the like), a magnetic storage medium or other magnetic storage device, or any suitable medium capable of carrying or storing desired program codes storable by a computer in a form of instructions or data structure. The memory 33 may be standalone, or connected with the processor by the bus. The memory 33 may also be integrated with the processor together.

In an embodiment, the memory 33 is used to store application program codes for performing the embodiments of the disclosure, which may be executed by the processor 31. The processor 31 is used to execute the application program codes stored in the memory 33.

In an embodiment, the processor 31 may comprise one or more CPUs such as CPU0 and CPU1 as shown in FIG. 10.

In an embodiment, the computing device 100 may comprise multiple processors such as the processor 31 and 38 as shown in FIG. 10. Each of these processors may be a single core processor (single CPU) or a multi cores processor (multi-CPU). The processors herein may refer to one or more devices, circuits and/or processors for processing data (such as computer program instructions).

In an embodiment, the computing device 100 may further comprise output device 35 and input device 36. The output device 35 communicates with the processor 31, and can display information in various ways. For example, the output device 35 may be a liquid crystal display (LCD), a light emitting diode (LED) display, a cathode ray tube (CRT) display, a projector or the like. The input device 35 communicates with the processor 31, and can receive user input in various ways. For example, the input device 36 may be a mouse, a keyboard, a touch screen device, a sensor or the like.

The above mentioned computing device 100 may be a general computing device or a dedicated computing device. In an embodiment, the computing device 100 may be a desktop, a portable computer, a network server, a personal digital assistant (PDA), a mobile phone, a tablet, a wireless terminal, a communication device, an embedded device or a device with the similar structure in the FIG. 10. The embodiments of the disclosure do not limit the type of the computing device 100.

The embodiments described herein provide an apparatus for location based touch. The apparatus may be applied in a projection system, which may comprise the computing device, a projector, and the projection display apparatus comprising a projection screen and a plurality of optical sensors with two-dimension disperse layout in the back of the projection screen. In the process of implementation of location based touch, first optical sensor of the projection display apparatus receives first light, wherein the first optical sensor is one or more of a plurality of optical sensors; the projection display apparatus determines first coordinate information of the first optical sensor on the projection screen if the light intensity of the first light is within first light intensity range; and then the projection display apparatus sends the first coordinate information to a computing device to cause the computing device to determine second coordinate information corresponding to the first coordinate information on a screen of the computing device according to the first coordinate information and pre-stored coordinate mapping relationship between a projection image and the screen of the computing device, and perform a touch operation corresponding to the second coordinate information within the screen of the computing device. It can be seen that the computing device is caused to determine the second coordinate information corresponding to the first coordinate information within the screen of the computing device by locating the first coordinate information of the first light within the projection screen, thereby realizing the touch operation corresponding to the second coordinate information, i.e., the location based touch of the projection display apparatus can be realized without the requirement of the operation on the computing device by the user, thereby facilitating the man-machine interaction between the user and the projection display apparatus.

In addition, it is noted that the projector may be a separated device, or may be integrated with the computing device together.

The specific features, structures, materials or characteristics can be combined in any one or more embodiments in any suitable ways.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

It should also be noted that, in some alternative implementations, the functions noted in the block may occur in an order different from that noted in the figures. Different functions noted in the disclosure may be performed in different sequence or executed substantially concurrently as required. It will also be noted that one or more of functions above can be optional or be combined as required.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A projection display apparatus comprising a projection screen, a plurality of optical sensors having a two-dimension disperse layout in the back of the projection screen, acquiring circuitry, determining circuitry and sending circuitry;

the acquiring circuitry configured to receive first light through a first optical sensor of the plurality of optical sensors, and acquire light intensity information based on second light output by a projector and sensed by at least one of the plurality of optical sensors after the second light reaches the projection screen to form a projection image, and wherein the first optical sensor is one or more of the plurality of optical sensors;

the determining circuitry configured to determine first coordinate information of the first optical sensor on the projection screen when a light intensity of the first light is within a first light intensity range, determine coordinate information of the at least one of the plurality of optical sensors corresponding to the light intensity information within a second light intensity range on the projection screen, and determine regional information of the projection image based on the coordinate information of the at least one of the plurality of optical sensors; and the sending circuitry configured to send the first coordinate information and the regional information to a computing device.

2. The projection display apparatus according to claim 1, wherein the plurality of optical sensors are N*M optical sensors having an array configuration, wherein both N and M are integers greater than 1, wherein the determining circuitry is configured to determine the first coordinate information of the first light on the projection screen as (X, Y) when the first optical sensor is the Y-th optical sensor in X-th column of the N*M optical sensors.

3. The projection display apparatus according to claim 1, wherein the sending circuitry is configured to send the first coordinate information to the computing device through wireline or wireless transmission.

4. The projection display apparatus according to claim 1, further comprising a receiving circuitry configured to receive a switch directive used for indicating enabling or disabling of a touch function.

5. A method comprising, at the projection display apparatus according to claim 1, receiving the first light by the first optical sensor in the projection display apparatus;

acquiring the light intensity information based on the second light output by the projector and sensed by the at least one of the plurality of optical sensors after the second light reaches the projection screen to form the projection image;

determining the first coordinate information of the first optical sensor on the projection screen if the light intensity of the first light is within the first light intensity range;

determining the coordinate information of the at least one of the plurality of optical sensors corresponding to the light intensity information within the second light intensity range on the projection screen;

determining the regional information of the projection image based on the coordinate information of the at least one of the plurality of optical sensors; and sending the first coordinate information and the regional information to the computing device.

6. The method according to claim 5, wherein the plurality of optical sensors are N*M optical sensors with array configuration, and wherein both N and M are integers greater than 1, and wherein determining the first coordinate information of the first optical sensor on the projection screen comprises:

determining the first coordinate information of the first light on the projection screen as (X, Y) if the first optical sensor is the Y-th optical sensor in X-th column of the N*M optical sensors.

7. The method according to claim 5, wherein sending the first coordinate information to the computing device comprises sending the first coordinate information to the computing device through wireline or wireless transmission.

8. The method according to claim 5, further comprising receiving a switch directive used for indicating enabling or disabling of a touch function.

* * * * *